US012766686B2

(12) United States Patent
Peltola et al.

(10) Patent No.: US 12,766,686 B2
(45) Date of Patent: Oct. 20, 2026

(54) LINEAR ELECTRIC MACHINE WITH TUBULAR SUPPORT STRUCTURE

(71) Applicant: LEKATECH OY, Kausala (FI)

(72) Inventors: Jyri Peltola, Kausala (FI); Tuomo Peltola, Kausala (FI); Juha Pyrhönen, Lappeenranta (FI)

(73) Assignee: LEKATECH OY, Kausala (FI)

( * ) Notice: Subject to any disclaimer, the term of this patent is extended or adjusted under 35 U.S.C. 154(b) by 604 days.

(21) Appl. No.: 17/278,105

(22) PCT Filed: Aug. 5, 2019

(86) PCT No.: PCT/FI2019/050576

§ 371 (c)(1),
(2) Date: Mar. 19, 2021

(87) PCT Pub. No.: WO2020/058565

PCT Pub. Date: Mar. 26, 2020

(65) Prior Publication Data

US 2022/0111504 A1 Apr. 14, 2022

(30) Foreign Application Priority Data

Sep. 21, 2018 (FI) ..................................... 20185790

(51) Int. Cl.
*B25D 11/06* (2006.01)
*H02K 15/03* (2006.01)
(Continued)

(52) U.S. Cl.
CPC ........... *B25D 11/064* (2013.01); *H02K 15/03* (2013.01); *H02K 41/031* (2013.01);
(Continued)

(58) Field of Classification Search
CPC .......... B25D 11/064; B25D 2217/0019; B25D 2222/54; H02K 41/031; H02K 1/04; H02K 1/34; H02K 5/02; H02K 15/03
(Continued)

(56) References Cited

U.S. PATENT DOCUMENTS 6,329,728 B1 * 12/2001 Kitazawa ............... H02K 41/03 310/14
2007/0024126 A1 * 2/2007 Brennvall ............. F04B 35/045 310/14
(Continued)

FOREIGN PATENT DOCUMENTS

DE 10 2015 116 881 4/2017
EP 1 195 229 A1 4/2002
(Continued)

OTHER PUBLICATIONS

Machine translation of JP-2011193641-A. (Year: 2011).*
(Continued)

*Primary Examiner* — Michael Andrews
(74) *Attorney, Agent, or Firm* — NIXON & VANDERHYE

(57) ABSTRACT

A linear electric machine includes a mover and a stator. The mover includes permanent magnets, and the stator includes a ferromagnetic core-structure and windings for conducting electric currents. The linear electric machine includes support structures on both sides of the ferromagnetic core-structure and supporting the mover to be linearly movable with respect to the stator in the longitudinal direction of the linear electric machine. At least one of the support structures includes a support element arranged to keep the mover a distance away from solid metal constituting a frame-portion of the support structure. The support element includes material whose electrical conductivity is less than that of the solid metal. As the mover is kept the distance away from the
(Continued)

solid metal, eddy currents induced by the moving permanent magnets to the solid metal are reduced.

20 Claims, 4 Drawing Sheets

(51) Int. Cl.
*H02K 41/03* (2006.01)
*H02K 1/04* (2006.01)
*H02K 1/34* (2006.01)
*H02K 5/02* (2006.01)

(52) U.S. Cl.
CPC .. *B25D 2217/0019* (2013.01); *B25D 2222/54* (2013.01); *H02K 1/04* (2013.01); *H02K 1/34* (2013.01); *H02K 5/02* (2013.01)

(58) Field of Classification Search
USPC ..................... 310/12.24, 12.21, 12.31, 12.33
See application file for complete search history.

(56) References Cited

U.S. PATENT DOCUMENTS

| | | | | |
|---|---|---|---|---|
| 2009/0058201 | A1* | 3/2009 | Brennvall | H02K 33/16 310/31 |
| 2009/0289509 | A1 | 11/2009 | Hoshi et al. | |
| 2010/0236802 | A1 | 9/2010 | Berger et al. | |
| 2012/0326533 | A1* | 12/2012 | Tang | H02K 41/031 310/12.24 |
| 2015/0151419 | A1* | 6/2015 | Bralla | H02K 7/145 173/1 |
| 2017/0198728 | A1* | 7/2017 | Noda | H02K 41/031 |
| 2017/0229945 | A1 | 8/2017 | Harnsberger et al. | |
| 2018/0297105 | A1* | 10/2018 | Otto | B21J 7/30 |

FOREIGN PATENT DOCUMENTS

| | | | | |
|---|---|---|---|---|
| EP | 1 465 328 | | 10/2004 | |
| EP | 1 612 336 | A1 | 1/2006 | |
| EP | 2 541 744 | | 1/2013 | |
| EP | 2 662 582 | | 11/2013 | |
| EP | 2662582 | A1 * | 11/2013 | C22C 19/055 |
| JP | 2000/079460 | | 3/2000 | |
| JP | 2002-192482 | A | 7/2002 | |
| JP | 2006-015484 | A | 1/2006 | |
| JP | 3783798 | | 6/2006 | |
| JP | 2006-280061 | A | 10/2006 | |
| JP | 2008-544871 | A | 12/2008 | |
| JP | 2009-060730 | A | 3/2009 | |
| JP | 2010-104091 | A | 5/2010 | |
| JP | 2011-166880 | A | 8/2011 | |
| JP | 2011-174569 | A | 9/2011 | |
| JP | 2011-193641 | | 9/2011 | |
| JP | 2011193641 | A * | 9/2011 | H02K 15/03 |
| JP | 2013-251992 | A | 12/2013 | |
| JP | 2013-255313 | | 12/2013 | |
| JP | 2015-523225 | A | 8/2015 | |
| WO | 2008/013053 | A1 | 1/2008 | |
| WO | 2009/028369 | | 3/2009 | |

OTHER PUBLICATIONS

International Search Report for PCT/FI2019/050576 dated Oct. 29, 2019, 4 pages.
Written Opinion of the ISA for PCT/FI2019/050576 dated Oct. 29, 2019, 9 pages.
Finnish Search Report for FI 20185790 dated May 12, 2020, 2 pages.
Finnish Search Report for FI 20185790 dated Apr. 18, 2019, 2, pages.
Office Action issued in Japanese Patent Application No. 2021-515160 dated May 9, 2023.

* cited by examiner

LINEAR ELECTRIC MACHINE WITH TUBULAR SUPPORT STRUCTURE

CROSS-REFERENCE TO RELATED APPLICATIONS

This application is the U.S. national phase of International Application No. PCT/FI2019/050576 filed Aug. 5, 2019 which designated the U.S. and claims priority to FI 20185790 filed Sep. 21, 2018, the entire contents of each of which are hereby incorporated by reference.

FIELD OF THE DISCLOSURE

The disclosure relates to a linear electric machine. Furthermore, the disclosure relates to a hammer device that comprises a linear electric machine.

BACKGROUND

A linear electric machine comprises a stator and a mover which is linearly movable with respect to the stator in the longitudinal direction of the linear electric machine. The mover and the stator are provided with magnetically operating means for converting electric energy into linear movement of the mover when the linear electric machine operates as a linear motor, and for converting linear movement of the mover into electric energy when the linear electric machine operates as a linear generator. The magnetically operating means may comprise for example multiphase windings for generating a magnetic field moving with respect to the multiphase windings when alternating currents are supplied to the multiphase windings. Furthermore, the magnetically operating means may comprise equipment for generating force in response to the moving magnetic field generated with the multiphase windings. The force-generating equipment may comprise for example permanent magnets, electromagnets, electrically conductive structures, and/or mechanical structures providing a spatial reluctance variation. The multiphase windings can be located in the stator and the force-generating equipment can be located in the mover. It is also possible that the multiphase windings are located in the mover and the force-generating equipment is located in the stator.

In a case where a linear electric machine for generating a reciprocating linear movement comprises permanents magnets in a mover, an active part of the mover that contains the permanent magnets is advantageously longer than a ferromagnetic core-structure of a stator to achieve a sufficient range for the reciprocating linear movement with respect to the total length of the linear electric machine. In this case, at least some of the permanent magnets of the mover are temporarily outside the area covered by the ferromagnetic core-structure of the stator. An inherent challenge related to a linear electric machine of the kind described above is that moving permanent magnets which are temporarily outside the area covered by the ferromagnetic core-structure of the stator cause changing magnetic fluxes which tend to induce eddy currents in electrically conductive materials of e.g. support structures for supporting the mover with respect to the stator so that the mover is linearly movable with respect to the stator in the longitudinal direction of the linear electric machine. The above-mentioned eddy currents cause losses and thereby reduce the efficiency of the linear electric machine. In principle, it is possible to provide the mover with end-portions which are free from permanent magnets and which are movably supported to a frame of the linear electric machine so far from the active part of the mover that electrically conductive materials of the above-mentioned support structures can be far from the permanent magnets. This would however increase the total length of the linear electric machine without increasing correspondingly the range of the reciprocating linear movement of the mover.

SUMMARY

The following presents a simplified summary to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new linear electric machine that comprises:

- a mover comprising an active part containing permanent magnets provided one after another in the longitudinal direction of the linear electric machine,
- a stator comprising a ferromagnetic core-structure and windings for conducting electric currents, and
- first and second support structures on both sides of the ferromagnetic core-structure of the stator in the longitudinal direction of the linear electric machine, the first and second support structures supporting the mover to be linearly movable with respect to the stator in the longitudinal direction of the linear electric machine.

The above-mentioned active part of the mover is longer than the ferromagnetic core-structure of the stator in the longitudinal direction of the linear electric machine, and the first support structure comprises a frame-portion made of solid metal, e.g. solid steel. The first support structure further comprises a support element arranged to keep the mover a distance away from the solid metal of the frame-portion and comprising a sliding surface being against the mover. The support element comprises material whose electrical conductivity, S/m, is less than that of the solid metal of the frame-portion, e.g. at most half of the electrical conductivity of the solid metal. The support element is tubular and arranged to surround an end-portion of the mover, the end-portion surrounded by the support element comprising an end-surface of the mover.

As the mover is kept the above-mentioned distance away from the solid metal of the frame-portion of the first support structure, eddy currents induced by the permanent magnets of the mover to the solid metal are reduced. Therefore, losses of the linear electric machine are reduced and thereby the efficiency of the linear electric machine is improved.

A linear electric machine according to the invention can be, for example but not necessarily, a tubular linear electric machine where the ferromagnetic core-structure of the stator is arranged to surround the mover and the windings of the stator are arranged to surround the mover and conduct electric currents in a circumferential direction.

In accordance with the invention, there is provided also a new hammer device that comprises:

a frame comprising elements for connecting to a working machine so that the frame is nondestructively detachable from the working machine, a hammering head supported to the frame and linearly movable with respect to the frame, and a linear electric machine according to the invention, the ferromagnetic core-structure of the stator of the linear electric machine being attached to the frame and the mover of the linear electric machine being arranged to move the hammering head.

A working machine, such as e.g. an excavator, is typically called an off-road machine. However, to emphasize that an ability for off-road operation is possible but not necessary, the broader term "working machine" is used in this document.

Various exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1A:
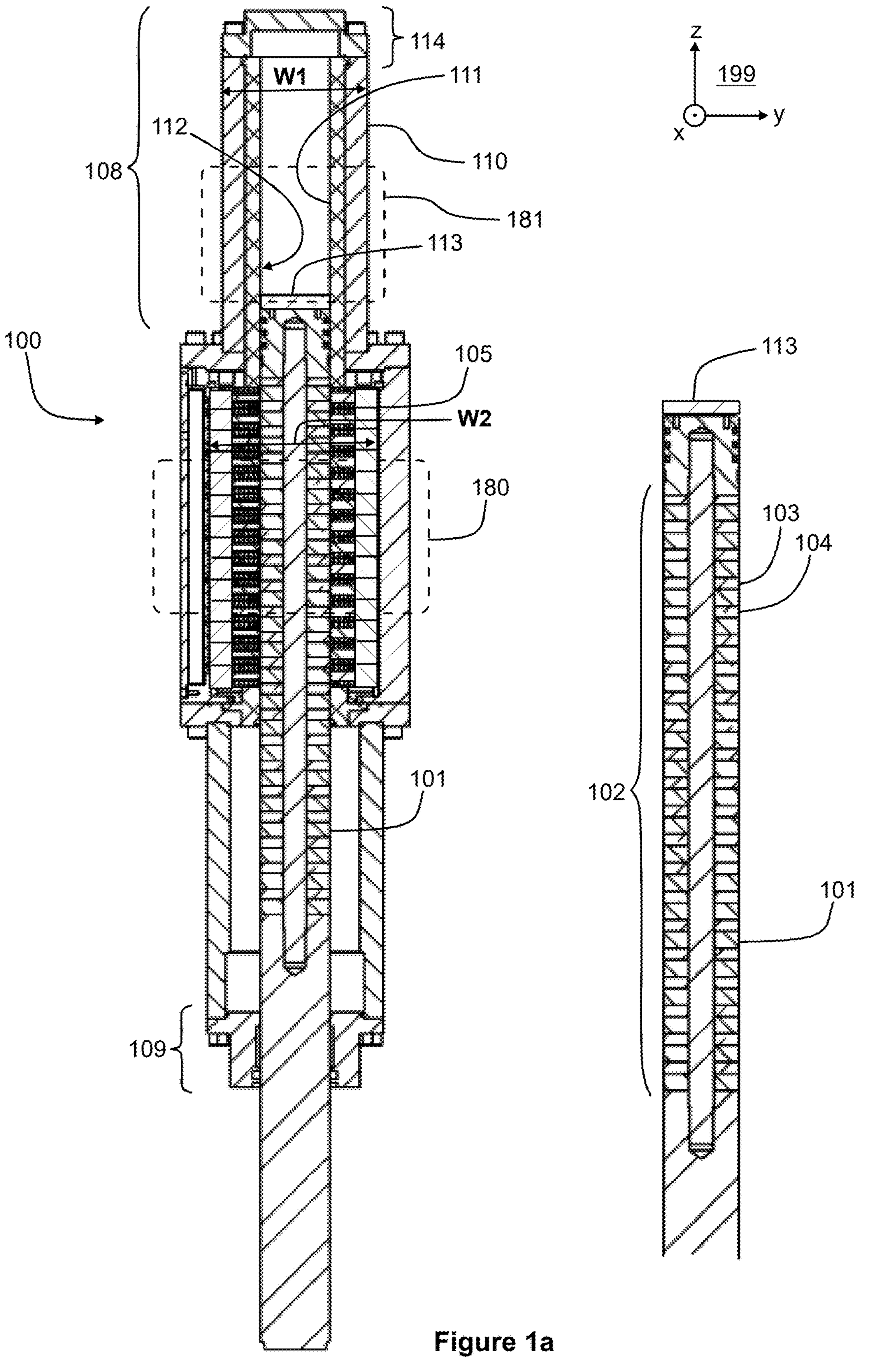
FIGS. 1*a*, 1*b*, and 1*c* illustrate a linear electric machine according to an exemplifying and non-limiting embodiment.
Figure 1B:
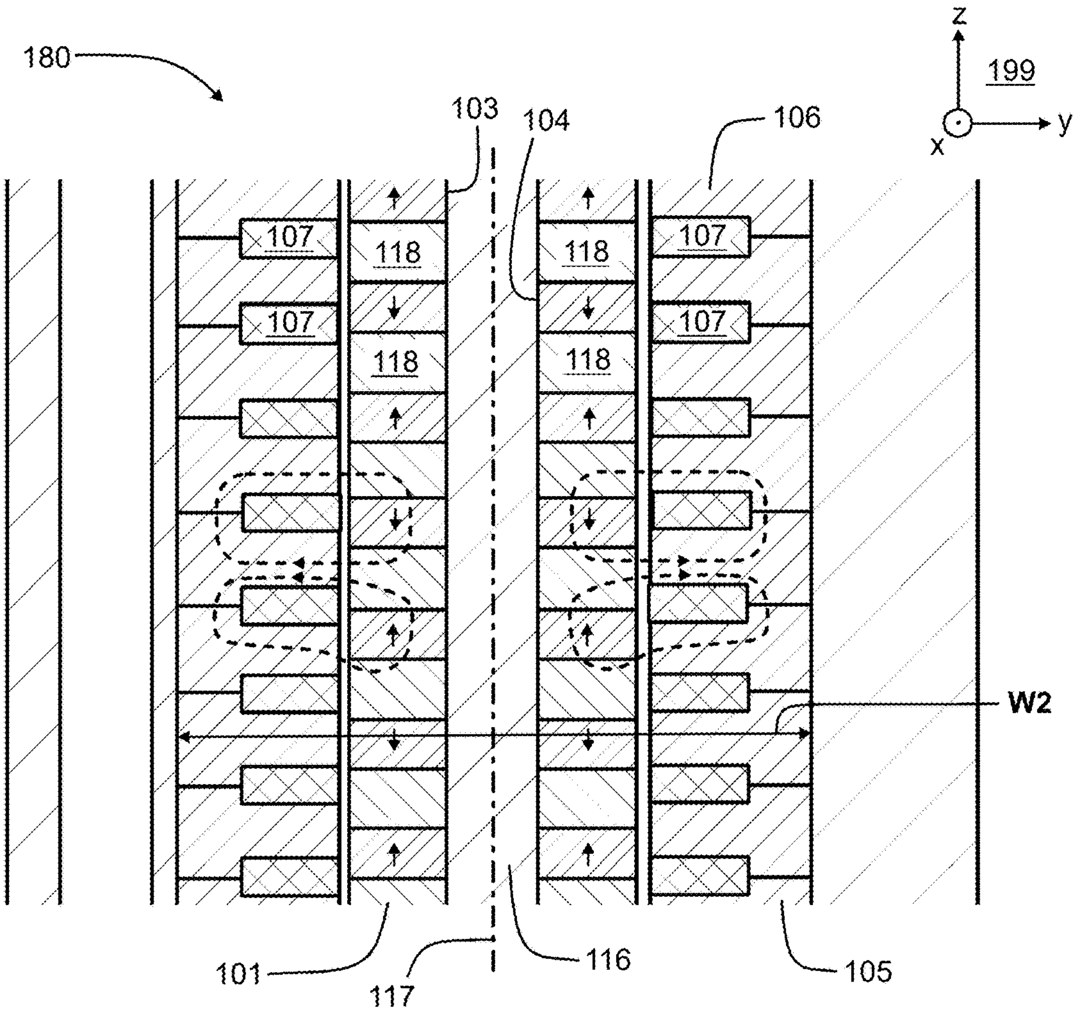
Figure 1C:
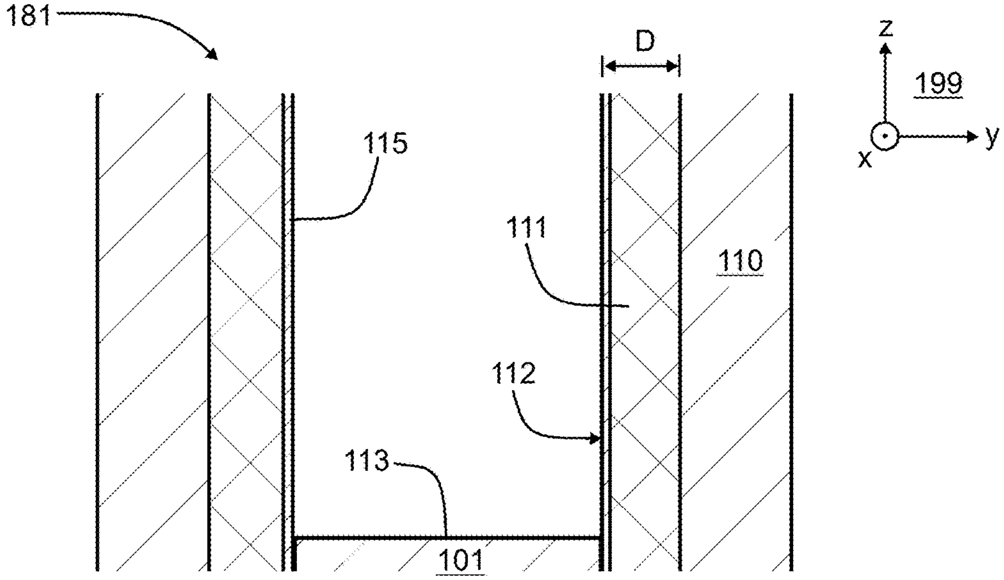

FIG. 1 a shows a section view of a linear electric machine 100 according to an exemplifying and non-limiting embodiment. The section plane is parallel with the yz-plane of a coordinate system 199. FIG. 1*b* shows a magnification of a part 180 of FIG. 1*a*, and FIG. 1*c* shows a magnification of a part 181 of FIG. 1*a*. The linear electric machine comprises a mover 101 and a stator 105. FIG. 1*a* shows a part of the mover 101 also separately for the sake of clarity. The mover 101 comprises an active part 102 that contains permanent magnets provided one after another in the longitudinal direction of the linear electric machine. The longitudinal direction is parallel with the z-axis of the coordinate system 199. In FIGS. 1*a* and 1*b*, two of the permanent magnets are denoted with references 103 and 104. The stator 105 comprises a ferromagnetic core-structure and windings for generating magnetic force acting on the mover 101 in response to supplying electric currents to the windings. In FIG. 1*b*, the ferromagnetic core-structure of the stator is denoted with a reference 106 and cross-sections of two coils of the windings are denoted with a reference 107. As shown in FIG. 1*b*, the ferromagnetic core-structure 106 constitutes stator slots for the coils of the windings. Typically, the windings are arranged to constitute a multi-phase winding, e.g. a three-phase winding, and the windings can be implemented for example so that each stator slot contains only one coil which belongs to one phase of the windings. It is, however, also possible that each stator slot contains for example two coils which can belong to different phases of the windings or to a same phase of the windings.

The linear electric machine 100 comprises first and second support structures 108 and 109 on both sides of the ferromagnetic core-structure of the stator in the longitudinal direction of the linear electric machine. The first and second support structures 108 and 109 are arranged to support the mover 101 to be linearly movable with respect to the stator 105 in the longitudinal direction of the linear electric machine. As shown in figure la, the active part 102 of the mover 101 is longer than the ferromagnetic core-structure of the stator 105 in the longitudinal direction of the linear electric machine. Thus, during a reciprocating linear movement of the mover 101, some of the permanent magnets of the mover 101 are temporarily inside a frame-portion 110 of the support structure 108. The frame-portion 110 is made of solid metal, e.g. solid steel, to achieve a sufficient mechanical strength. The support structure 108 further comprises a support element 111 arranged to keep the mover 101 a distance away from the solid metal of the frame-portion 110. In FIG. 1*c*, the above-mentioned distance is denoted with D. The support element 111 constitutes a sliding surface 112 that is against the mover and supports the mover 101 in transversal directions, i.e. in directions perpendicular to the longitudinal direction of the linear electric machine. The support element 111 comprises material whose electrical conductivity, S/m, is less than that of the solid metal of the frame-portion 110. The electrical conductivity of the material of the support element 111 can be e.g. less than 50%, 40%, 30%, 20%, 10%, or 5% of the electrical conductivity of the solid metal of the frame-portion 110. As the mover 101 is kept the distance D away from the solid metal of the frame-portion 110, eddy currents induced by the moving permanent magnets of the mover to the solid metal are reduced. As a corollary, losses of the linear electric machine are reduced and thereby the efficiency of the linear electric machine is improved. The distance D can be e.g. at least 5 mm, at least 10 mm, at least 15 mm, at least 20 mm, at least 25 mm, or at least 30 mm. As shown in FIG. 1*a*, the ferromagnetic core-structure of the stator 105 is wider (W2) in a transverse direction perpendicular to the longitudinal direction than the frame-portion 110 (W1) of the first support structure 108, i.e., W2>W1.

The support element 111 may comprise for example polymer material or some other suitable material having low electrical conductivity and suitable mechanical properties. The polymer material can be e.g. polytetrafluoroethylene, known as Teflon. In a linear electric machine according to an exemplifying and non-limiting embodiment, the support element 111 comprises a coating constituting the sliding surface that is against the mover 101. In FIG. 1*c*, the coating is denoted with a reference 115. The coating improves the wear resistance of the sliding surface of the support element 111. The coating can be for example a layer of chrome. In cases, where the coating is made of electrically conductive material, the coating is advantageously thin to reduce eddy current losses in the coating. In FIG. 1*c*, the thickness of the coating 115 is exaggerated for the sake of clarity.

The exemplifying linear electric machine illustrated in FIGS. 1*a*-1*c* is a tubular linear electric machine where the ferromagnetic core-structure 106 of the stator 105 is arranged to surround the mover 101 and the windings 107 of the stator are arranged to surround the mover 101 and conduct electric currents in a circumferential direction. The mover 101 can be, for example but not necessarily, substantially rotationally symmetric with respect to a geometric line 117 shown in FIG. 1*b*. The mover 101 comprises ferromagnetic core-elements that are alternately with the permanent magnets in the longitudinal direction of the mover. In FIG. 1*b*, two of the ferromagnetic core-elements of the mover 101 are denoted with a reference 118. In this exemplifying case, the magnetization directions of the permanent magnets of the mover 101 are parallel with the longitudinal direction, and longitudinally neighboring ones of the permanent magnets have magnetization directions opposite to each other. In FIG. 1*b*, the magnetization directions of the permanent magnets are depicted with arrows. Exemplifying magnetic flux lines are denoted with curved dashed lines. In this exemplifying case, the mover 101 comprises a center rod 116 that mechanically supports the permanent magnets and the ferromagnetic core-elements of the mover. The center rod 116 is advantageously made of non-ferromagnetic material in order that as much as possible of the magnetic fluxes generated by the permanent magnets of the mover 101 would flow via the stator 105. The center rod 116 can be made of for example austenitic steel or some other sufficiently strong non-ferromagnetic material.

In the exemplifying linear electric machine illustrated in FIGS. 1*a*-1*c*, the support element 111 is tubular and arranged to surround an end-portion 113 of the mover 101. An end-portion 114 of the support structure 108 is closed, and the end-portion 113 of the mover 101 is arranged to operate as a piston for compressing gas, e.g. air, when the mover 101 moves towards the closed end-portion 114 of the support structure 108. The gas in the room limited by the tubular support element 111, the end portion 114 of the support structure 108, and the end-portion 113 of the mover 101 acts as a gas spring that intensifies the movement of the mover 101 in the negative z-direction of the coordinate system 199 and acts against the movement of the mover 101 in the positive z-direction of the coordinate system 199.

Figure 2:
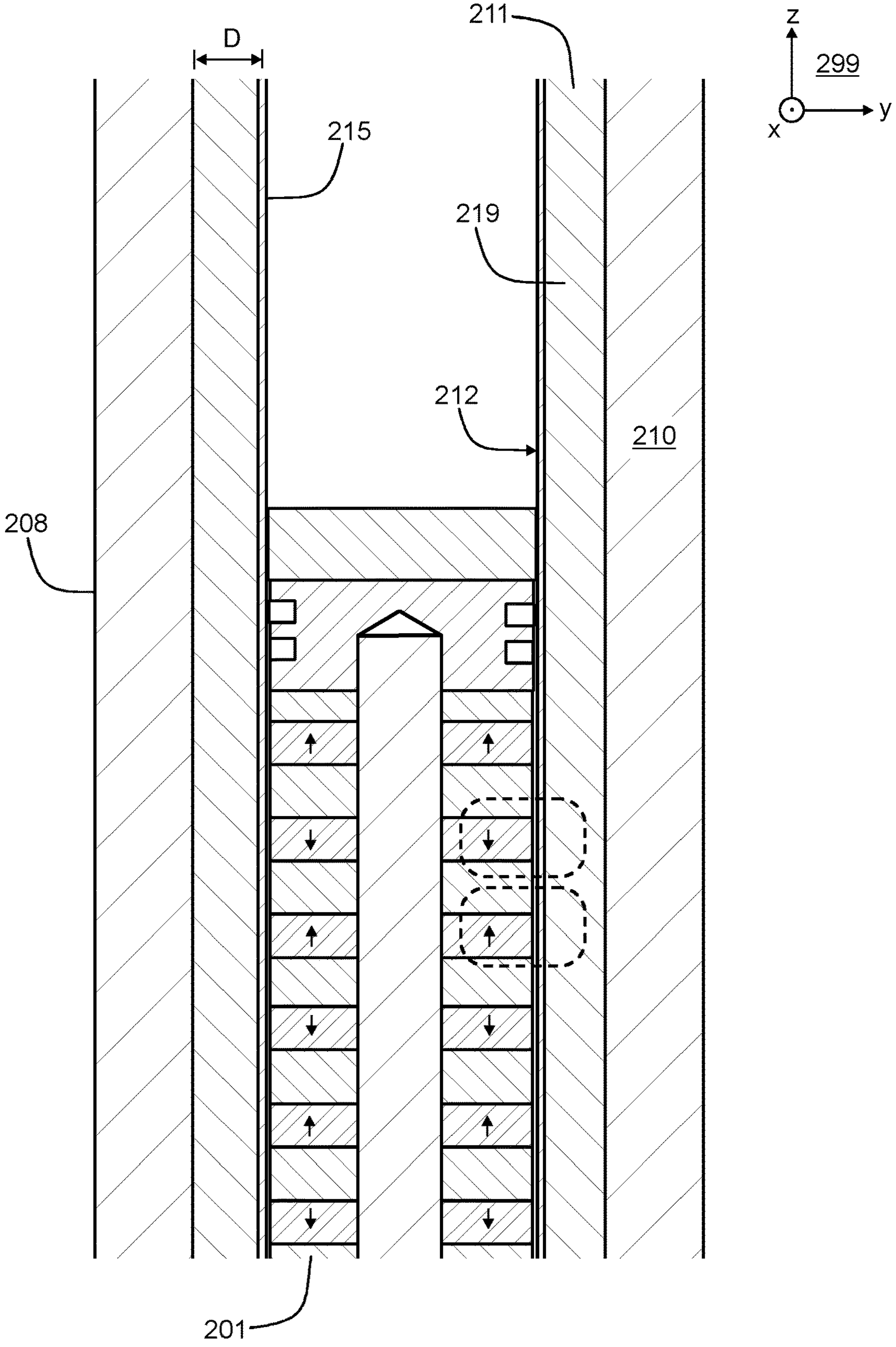
FIG. 2 illustrates a detail of a linear electric machine according to another exemplifying and non-limiting embodiment.

FIG. 2 shows a section view of a part of a linear electric machine according to an exemplifying and non-limiting embodiment. The section plane is parallel with the yz-plane of a coordinate system 299. FIG. 2 illustrates a part of a support structure 208 of the linear electric machine and a part of a mover 201 of the linear electric machine. The support structure 208 is arranged to support the mover 201 in the same way as the support structure 108 is arranged to support the mover 101 in the linear electric machine 100 illustrated in FIGS. 1*a*-1*c*. The support structure 208 comprises a support element 211 that comprises material whose electrical conductivity is less than that of solid metal constituting a frame-portion 210 of the support structure 208. In this exemplifying linear electric machine, the support element 211 comprises ferromagnetic material 219 whose electrical conductivity is less than that the solid metal constituting the frame-portion 210, e.g. at most half of the electrical conductivity of the solid metal. The ferromagnetic material 219 provides low reluctance paths for magnetic fluxes generated by permanent magnets of the mover 201, and thereby the ferromagnetic material 219 reduces magnetic stray fluxes directed to the frame-portion 210 of the support structure 208. Furthermore, the ferromagnetic material 219 reduces the flux variation taking place in the permanent magnets and thereby the ferromagnetic material reduces losses of the permanent magnets. The ferromagnetic material 219 can be for example ferrite or iron powder composite such as e.g. SOMALOY® Soft Magnetic Composite. The support element 211 further comprises a coating 215 on a surface of the ferromagnetic material and constituting a sliding surface that is against the mover 201. The coating 215 can be for example a layer of chrome.

Figure 3:
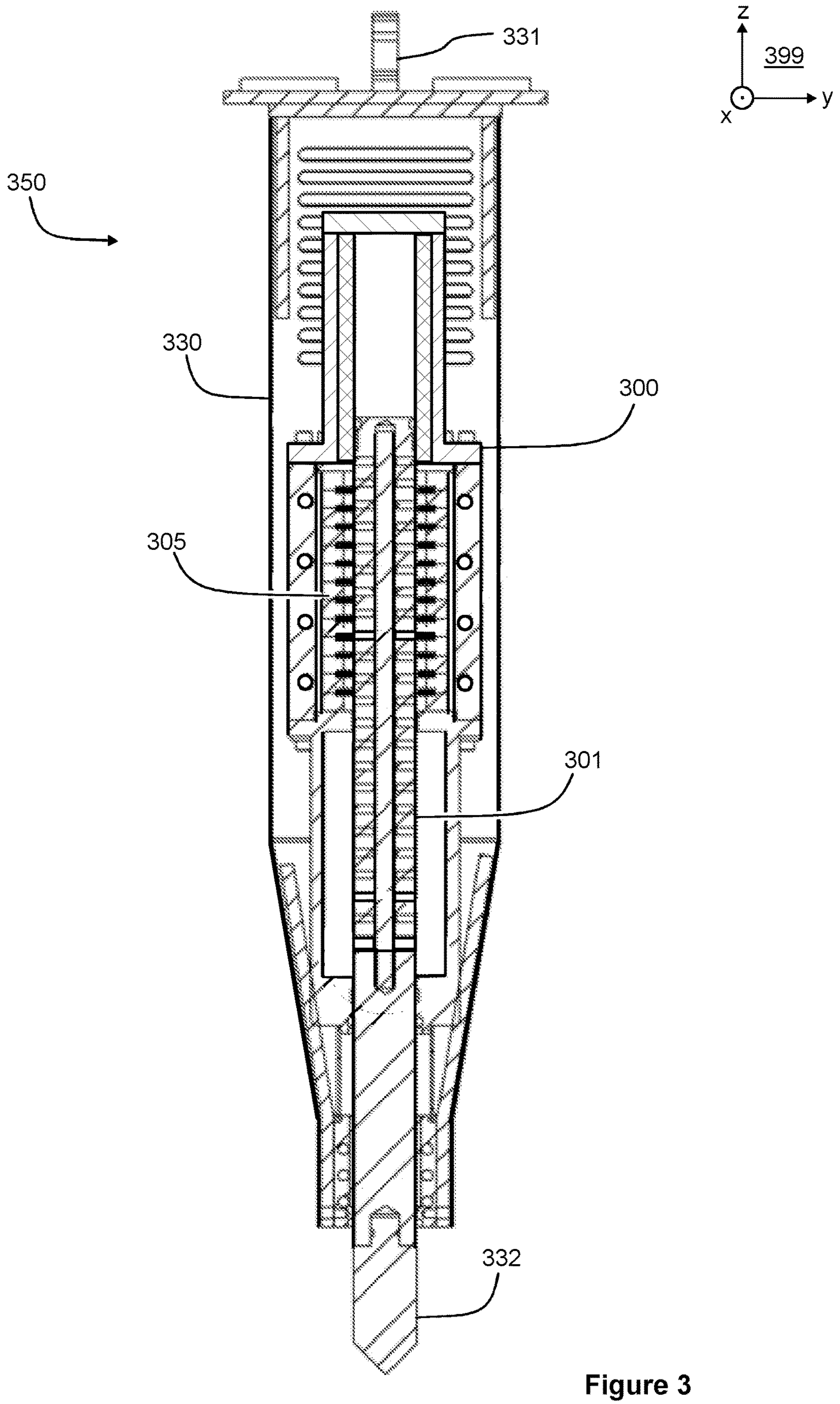
FIG. 3 illustrates a hammer device that comprises a linear electric machine according to an exemplifying and non-limiting embodiment.

FIG. 3 shows a section view of a hammer device 350 according to an exemplifying and non-limiting embodiment. The section plane is parallel with the yz-plane of a coordinate system 399. The hammer device comprises a frame 330 that comprises elements 331 for connecting to a working machine such as e.g. an excavator so that the frame 330 is nondestructively detachable from the working machine. The hammer device 350 comprises a hammering head 332 supported to the frame 330 and linearly movable with respect to the frame. The hammer device 350 comprises a linear electric machine 300 according to an embodiment of the invention. A stator 305 of the linear electric machine 300 is attached to the frame 330, and a mover 301 of the linear electric machine 300 is arranged to move the hammering head 332. The linear electric machine 300 can be for example such as illustrated in FIGS. 1*a*-1*c* or such as illustrated in FIG. 2.

It is, however, worth noting that a hammer device of the kind described above is only one exemplifying application for a linear electric machine according to an embodiment of the invention, but linear electric machines according to embodiments of the invention can be used in many other applications too.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A linear electric machine comprising:

a mover comprising an active part containing permanent magnets provided one after another in a longitudinal direction of the linear electric machine;

a stator comprising a ferromagnetic core-structure and windings configured to conduct electric currents; and first and second support structures on both sides of the ferromagnetic core-structure of the stator in the longitudinal direction of the linear electric machine, the first and second support structures supporting the mover to be linearly movable with stator in the respect to the longitudinal direction of the linear electric machine, wherein the active part of the mover is longer in the longitudinal direction of the linear electric machine than the ferromagnetic core-structure of the stator, and the first support structure comprises

- a frame-portion made of solid metal, and
- a support element configured to keep the mover a distance away from the solid metal of the frame-portion and comprising a sliding surface being against the active part of the mover on a part of a moving range of the mover, the support element comprising material whose electrical conductivity is at most half of electrical conductivity of the solid metal of the frame-portion, the support element being tubular and configured to surround an end-portion of the mover so that a gap between the mover and the ferromagnetic core-structure of the stator is free from the support element, the ferromagnetic core-structure of the stator being wider in a transverse direction perpendicular to the longitudinal direction than the frame-portion of the first support structure, the end-portion of the mover surrounded by the support element comprising an end-surface of the mover, the end-surface being an ultimate end of the mover.

2. The linear electric machine according to claim 1, wherein an end-portion of the first support structure is closed, and the end-portion of the mover located in the tubular support element is configured to operate as a piston to compress gas in response to a movement of the mover towards the closed end-portion of the first support structure.

3. The linear electric machine according to claim 2, wherein the support element comprises polymer material.

4. The linear electric machine according to claim 2, wherein the support element comprises a coating constituting the sliding surface being against the mover.

5. The linear electric machine according to claim 2, wherein the support element comprises ferromagnetic material configured to reduce magnetic stray fluxes directed to the frame-portion of the first support structure, and a coating on a surface of the ferromagnetic material and constituting the sliding surface being against the mover, the electrical conductivity of the ferromagnetic material being at most half of the electrical conductivity of the solid metal of the frame-portion of the first support structure.

6. The linear electric machine according to claim 1, wherein the support element comprises polymer material.

7. The linear electric machine according to claim 6, wherein the support element comprises a coating constituting the sliding surface being against the mover.

8. The linear electric machine according to claim 6, wherein the support element comprises ferromagnetic material configured to reduce magnetic stray fluxes directed to the frame-portion of the first support structure, and a coating on a surface of the ferromagnetic material and constituting the sliding surface being against the mover, the electrical conductivity of the ferromagnetic material being at most half of the electrical conductivity of the solid metal of the frame-portion of the first support structure.

9. The linear electric machine according to claim 1, wherein the support element comprises a coating constituting the sliding surface being against the mover.

10. The linear electric machine according to claim 9, wherein the coating is a layer of chrome.

11. The linear electric machine according to claim 1, wherein the support element comprises ferromagnetic material configured to reduce magnetic stray fluxes directed to the support structure, and a coating on a surface of the frame-portion of the first ferromagnetic material and constituting the sliding surface being against the mover, the electrical conductivity of the ferromagnetic material being at most half of the electrical conductivity of the solid metal of the frame-portion of the first support structure.

12. The linear electric machine according to claim 11, wherein the coating is a layer of chrome.

13. The linear electric machine according to claim 1, wherein the linear electric machine is a tubular linear electric machine in which the ferromagnetic core-structure of the stator is configured to surround the mover and the windings of the stator are configured to surround the mover and conduct electric currents in a circumferential direction.

14. The linear electric machine according to claim 13, wherein the mover comprises ferromagnetic core-elements that are alternately with the permanent magnets in the longitudinal direction, magnetization directions of the permanent magnets being parallel with the longitudinal direction, and longitudinally neighboring ones of the permanent magnets having magnetization directions opposite to each other.

15. The linear electric machine according to claim 13, wherein the mover is substantially rotationally symmetric with respect to a geometric line parallel with the longitudinal direction.

16. The linear electric machine according to claim 13, wherein the mover comprises a center rod surrounded by the permanent magnets.

17. The linear electric machine according to claim 16, wherein the center rod is made of non-ferromagnetic material.

18. The linear electric machine according to claim 1, wherein the electrical conductivity of the material of the support element is at most 10% of the electrical conductivity of the solid metal of the frame-portion of the first support structure.

19. The linear electric machine according to claim 1, wherein the distance is at least 5 mm.

20. A hammer device comprising:

a frame comprising elements configured to connect to a working machine so that the frame is nondestructively detachable from the working machine;

a hammering head supported to the frame and linearly movable with respect to the frame; and a linear electric machine comprising:

a mover comprising an active part containing permanent magnets provided one after another in a longitudinal direction of the linear electric machine, a stator comprising a ferromagnetic core-structure and windings configured to conduct electric currents, and first and second support structures on both sides of the ferromagnetic core-structure of the stator in the longitudinal direction of the linear electric machine, the first and second support structures supporting the mover to be linearly movable with respect to the stator in the longitudinal direction of the linear electric machine, wherein the active part of the mover is longer in the longitudinal direction of the linear electric machine than the ferromagnetic core-structure of the stator, the first support structure comprises a frame-portion made of solid metal, and a support element configured to keep the mover a distance away from the solid metal of the frame-portion and comprising a sliding surface being against the active part of the mover on a part of a moving range of the mover, the support element comprising material whose electrical conductivity is at most half of electrical conductivity of the solid metal of the frame-portion, the support element being tubular and configured to surround an end-portion of the mover, the end-portion surrounded by the support element comprising an end-surface of the mover SO that a gap between the mover and the ferromagnetic core-structure of the stator is free from the support element, the ferromagnetic core-structure of the stator being wider in a transverse direction perpendicular to the longitudinal direction than the frame-portion of the first support structure, the end-portion of the mover surrounded by the support element comprising an end-surface of the mover, the end-surface being an ultimate end of the mover, and wherein the ferromagnetic core-structure of the stator of the linear electric machine is attached to the frame and the mover of the linear electric machine is configured to move the hammering head.

* * * * *